3,462,386
ORGANOSILICON MATERIALS AND METHOD
FOR MAKING THEM
John C. Goossens, Scotia, N.Y., assignor to General
Electric Company, a New York corporation
Filed May 3, 1965, Ser. No. 452,919
Int. Cl. C08g 31/10, 31/24, 31/34
U.S. Cl. 260—37                                          13 Claims

ABSTRACT OF THE DISCLOSURE

A substantially solvent-free polymerization method is provided for making organosilicon polymers from low molecular weight silanol containing organosilicon materials utilizing an organosilane of the formula $$H(R)SiYY'$$

where R is selected from monovalent hydrocarbon radicals and halogenated monovalent hydrocarbon radicals, Y is a hydrolyzable radical, and Y' is a member selected from Y and $(OSiR'_2)_nSiR(H)Y$, R' is selected from R radicals and cyanoalkyl radicals, and $n$ is an integer equal to 1 to 1,500, inclusive. Polymerization is achieved in the substantial absence of water. Copolymers, such as block copolymers, can be made having from 5 to 1,000 chemically combined diorganosiloxy units. The copolymer blocks, which can be derived from the lower molecular weight silanol containing organosilicon material, are joined to each other by one or more siloxy units having hydrogen attached to silicon.

---

The present invention relates to organosilicon materials having siloxy units with hydrogen attached to silicon and a method for making them. More particularly, the present invention relates to the employment of certain difunctional organosilanes having hydrogen attached to silicon, to effect the intercondensation of silanol-containing organosilicon material.

Prior to the present invention, methods were available for effecting the intercondensation of silanol-containing organosilicon materials, such as hydroxysilanes and silanol-terminated organopolysiloxanes to provide for the formation of siloxane linkages and higher molecular weight organopolysiloxane such as fluids and gums. For example, Bruner Patent 3,105,061 shows a method for effecting the polymerization of silanol-containing organosilicon material, by employing diorganodiacyloxy silane or diorganodiacyloxy-terminated siloxane. As shown by experience, the diacyloxyorganosilicon material employed by Bruner cannot be used for making high molecular weight organopolysiloxane polymers, such as gums suitable for making organopolysiloxane elastomers. Experience has also shown that Bruner's diacyloxyorganosilicon materials often prove to be ineffective unless they are utilized in the substantial absence of moisture. In addition, elevated temperatures and amine catalysts are often required before desirable results can be achieved.

Another method that can be employed to make organopolysiloxanes is shown by Morehouse et al. Patent 3,133,110. Morehouse et al. employ bis-(alkylamino) organosilicon materials to effect intercondensation of silanol-containing organosilicon materials. Although the avoidance of moisture has been found to be less critical with respect to the use of the bis-(alkylamino)organosilicon materials of Morehouse et al., experience has shown that the Morehouse et al. method is also unsatisfactory for making high molecular weight organopolysiloxanes.

The present invention is based on the discovery that difunctional organosilane of the formula, (1) $$H(R)SiYY'$$

where R is selected from monovalent hydrocarbon radicals and halogenated monovalent hydrocarbon radicals, Y is a hydrolyzable radical, and Y' is a member selected from Y and $(OSiR'_2)_nSiR(H)Y$, where R' is selected from R radicals and cyanoalkyl radicals, and $n$ is an integer equal to 1 to 1,500, inclusive, can effect rapid molecular weight build-up of silanol-containing organosilicon materials.

Silanes included by Formula 1 are, for example, bis-(amino)organosilanes of the formula, (2) $$H(R)SiQQ'$$

where Q is a monovalent amine radical selected from —NR'''V and a heterocyclic amine joined to silicon by a silicon-nitrogen linkage, R''' is selected from alkyl and cycloalkyl radicals, V is a member selected from hydrogen and R''' radicals, and Q' is a member selected from Q and $(OSiR'_2)_nSiR(H)Y$, where $n$ and R' are as previously defined. There are also included by Formula 3 diacyloxyorganosilanes of the formula, (3) $$H(R)Si(OCOR''')(Z)$$

where Z is selected from OCOR''' and $$(OSiR'_2)_nSiR(H)OCOR'''$$

dihalogenoorganosilanes of the formula, (4) $$H(R)SiXX'$$

where R, R''' and $n$ are as previously defined, X is a halogen radical, for example, chloro, bromo, fluoro, etc., and X' is selected from X and $(OSiR'_2)_nSiR(H)X$. In addition to the preferred silanes of Formula 2, 3 and 4 there also are included bis-(ketoximato)organosilanes, dialkoxyorganosilanes, and other difunctional hydroxy-reactive organosilanes.

There is provided by the present invention, a method which comprises mixing together at a temperature in the range of between —20° C. to 200° C., (A) difunctional organosilane of Formula 1, and (B) silanol-containing organosilicon material selected from, (a) a silanol having the formula, (5) $$W R'_2SiG$$

(b) a silanol-containing organopolysiloxane consisting essentially of chemically combined units of the formula, (6) $$R'_2SiO$$

and (c) a polysilhydrocarbon consisting essentially of chemically combined units of the formula, (7) $$R'_2SiR''$$

where R' is defined above, W is selected from hydroxy and R', G is selected from hydroxy and R''SiR'$_2$OH, and R'' is a divalent hydrocarbon radical.

Silanol-containing organosilicon materials which can be employed in the practice of the invention are more particularly defined by the following formula, (8) 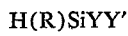

where R', W, R'' and $n$ are defined above, $a$ is a whole number equal to 0 to 100, inclusive, and $x$ is equal to 1, and when $n$ and $a$ are each equal to 1, $x$ can be equal to 1 to 100, inclusive.

Radicals included by R of Formula 1 are aryl radicals, such as phenyl, tolyl, naphthyl, etc.; aralkyl radicals such as phenylethyl, benzyl, etc.; alkyl radicals such as methyl, ethyl, propyl, isopropyl, butyl, isobutyl, hexyl, heptyl, octyl, etc.; alkenyl radicals such as vinyl, allyl, etc. radicals; haloalkyl such as chloroethyl, trifluoropropyl, tetrafluorobutyl, etc.; cycloalkyl such as cyclohexyl, cycloheptyl, etc.; cycloalkenyl such as cyclohexenyl, cycloheptenyl, etc. Radicals included by R' are all of the aforementioned R radicals and cyanoethyl, cyanopropyl, cyanobutyl, cyanopentyl, etc. Radicals included by R'' are arylene such as phenylene, tolylene, naphthalene, etc.; alkylene such as methylene, ethylene, trimethylene, tetramethylene, etc. Radicals included by R''' are hydrogen and all of the aforementioned alkyl and cycloalkyl radicals included by R. Where R, R', R'' and R''' can represent more than one radical, respectively, these radicals can be all the same or they can be any two or more of the aforementioned radicals.

Bis-(amino)organosilanes of Formula 2, include for example, bis-(alkylamino)organosilanes such as bis-(dimethylamino)methylsilane, bis-(dimethylamino)phenylsilane, bis-(methylethylamino)vinylsilane, bis-(isopropylamino)methylsilane, bis-(tert-butylamino)allylsilane, etc., bis-(heterocyclicamino)organosilanes such as bis-(morpholino)methylsilane, bis-(piperidino)phenylsilane, bis-(pyrrolidino)vinylsilane, etc.

Some of the diacyloxyorganosilanes shown by Formula 3 are for example, diacetoxymethylsilane, diacetoxyphenylsilane, diacetoxyvinylsilane, dibutyroxymethylsilane, etc.

Included by the dihaloorganosilanes of Formula 4 are for example, methyldichlorosilane, phenyldichlorosilane, vinyldichlorosilane, isopropyldichlorosilane, methyldibromosilane, etc.

In addition to the above-described difunctional organosilane there are also included bis-(ketoximato)organosilane such as bis-(dimethylketoximato)methylsilane, bis-(methylethylketoximato)phenylsilane, etc., dialkoxyorganosilane, such as methyldimethoxysilane, phenyldiethoxysilane.

The silanol-containing organosilicon material of Formula 8 includes for example, diphenylsilanediol, silanol-terminated polydimethylsiloxane, silanol-terminated polydiphenylsiloxane, silanol-terminated polymethylphenylsiloxane, silanol-terminated copolymers consisting essentially of dimethylsiloxy units with methylcyanoethylsiloxy units, methyltrifluoropropylsiloxy, etc. The silanol-containing organosilicon materials also can contain a minor amount of organosiloxy units such as methylsiloxy, phenylsiloxy, etc.

In addition, the silanol-containnig organosilicon materials can be triorganosilanol, such as trimethylsilanol, triphenylsilanol, etc..; a polydiorganosiloxane terminated with a triorganosiloxy unit such as a trimethylsiloxy unit, dimethylvinylsiloxy unit, etc., and a diorganosilanol unit such as a dimethylsilanol, methylphenylsilanol, etc. As shown by Formula 8, the silanol-containing organosilicon material also can be a silanol-terminated silarylene, silalkylene, polysilarylene, polysilalkylene, such as silphenylenediol, silbutylenediol, silanol-terminated polysilphenylene, silanol-terminated polysilethylene, etc. In addition, the silanol-containing silhydrocarbons of Formula 8 can be terminated by up to one triorganosiloxy unit as described above. Silanol-containing silarylene siloxane copolymers, silalkylenesiloxane copolymers also are included.

Methods for preparing some of the silanol-containing organopolysiloxanes included by Formula 8 consisting essentially of chemically combined units of Formula 6 are well known to those skilled in the art. For example, a cyclic polydiorganosiloxane such as octamethylcyclotetrasiloxane can be equilibrated by use of an equilibration catalyst, such as potassium hydroxide, and controlled amounts of water can be added to the resulting high molecular weight polydiorganosiloxane to achieve a desired viscosity, such as from 200 centipoises to $10^6$ centipoises and preferably 1,000 to 20,000 centipoises at 25° C. Methods for making some of the silanol-containing disilhydrocarbons and polysilhydrocarbons included by Formula 8 are shown by Sveda Patents 2,561,429 and 2,562,000.

Contact between silanol-terminated diorganosiloxane and difunctional organosilane can result in the formation of a siloxane linkage as shown by the following equation, $$Y(H)(R)SiY + HO(R')_2SiO \rightarrow Y(H)(R)SiO(R')_2SiO + HY$$

where Y, R, and R' are as defined above.

A significant feature of the present invention is that it provides for the production of block copolymers composed of organopolysiloxane blocks consisting essentially of chemically combined units of Formula 6 joined by one or more chemically combined organosiloxy units having hydrogen attached to silicon; block copolymers composed of polysilhydrocarbon blocks consisting essentially of chemically combined units of Formula 7 joined by one or more chemically combined organosiloxy units having hydrogen attached to silicon also are included. In addition there are provided mixtures of organopolysiloxane blocks, polysilhydrocarbon blocks, blocks of silhydrocarbonsiloxane, etc., joined by one or more chemically combined organosiloxy units HR'SiO.

These block copolymers can have viscosities in the range of between 500 to one billion centipoises at 25° C. and preferably are gums having a viscosity between 500,000 to one billion centipoises. Preferably, the block sizes are between 5 to 1,000 chemically combined diorganosiloxy units, diorganosilhydrocarbon units, etc.

For example, some of the block copolymers which can be made in accordance with the practice of the invention are,

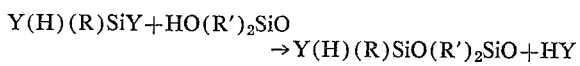

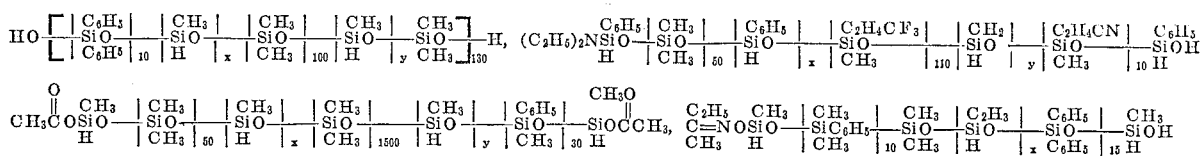

where $x$ or $y$ can be equal to from 1 to 10, inclusive.

The block copolymers provided by the subject invention can be cured at temperatures in the range of between 50° C. to 200° C. by the employment of a platinum catalyst such as platinic chloride, platinum olefin complex, etc., such as shown in Ashby Patent 3,159,601, assigned to the same assignee as the present invention, in combination with an organic material or organosilicon material having at least two olefinically unsaturated monovalent organic radicals. For example, olefinically unsaturated organosilicon materials of the formula,

(10) 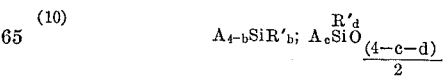

can be employed, where A is an olefinically unsaturated monovalent hydrocarbon radical such as included by R above, $b$ is a whole number equal to 0 to 2, inclusive, $c$ has a value equal to 0.01 to 2, inclusive, $d$ has a value equal to 0 to 2, inclusive, and the sum of $c$ and $d$ equals 1.5 to 3, inclusive. Organosilicon materials included by Formula 10 are for example, divinyldiphenylsilane, 1,3-divinyltetramethyldisiloxane, tetravinyltetramethylcyclotetrasiloxane, etc. Olefinically unsaturated organic materials also can be utilized to modify the organosilicon materials. For example, an alkene can be added to hydrogen attached to silicon in the presence of a platinum catalyst to modify the properties of the organosilicon materials. Suitable olefins include for example, α-methylstyrene, decene-1, etc.

Included among the organopolysiloxane polymers that can be made in accordance with the practice of the invention containing chemically combined siloxy units with hydrogen attached to silicon are gums having a viscosity in the range of between 500,000 centipoises to as high as one billion centipoises at 25° C. In instances where it is desired to produce organopolysiloxane gums having desirable milling characteristics, silanol-containing organosilicon material of the formula,

(11) 

can be utilized in combination with the silanol-containing organosilicon material of Formula 8, in a proportion sufficient to provide for organosilicon polymers having a ratio of the sum of hydrogen, R and R′ radicals per silicon atom from 1.95 to about 2.001, where $m$ is an integer equal to from 3 to 1,000, inclusive. Alternatively, as taught in Patent 3,305,525 and assigned to the same assignee as the present invention, effective amount of monofunctional silylamine $R_3SiQ$, can be utilized in place of the organosilicon materials of Formula 11 if desired.

Organopolysiloxane block copolymers made in accordance with the invention having a viscosity between 500,000 centipoises to $6 \times 10^8$ centipoises can be employed in applications similar to the polymers shown by Agens Patent 2,448,756, Sprung et al. Patent 2,448,556, Marsden Patent 2,521,528, all assigned to the same assignee as the present invention. These gums also can be milled with from 30 to 300 parts of filler, such as fumed silica, as well as extending fillers such as titanium oxide, etc. Depending upon the frequency of chemically combined siloxy units with hydrogen attached to silicon in the polymer chain, cure of the gum can be effected by platinum catalyst with an olefinically unsaturated material such as shown by Formula 10 as previously mentioned, or cure can be effected with standard peroxide curing catalyst, e.g., benzoyl, bis-(2,4-dichlorobenzoyl)peroxide.

The process of the invention can be practiced by mixing the difunctional organosilane of Formula 1 and the silanol-containing organosilicon material. Preferably, a temperature between 0° C. to 100° C. can be employed.

The order of addition of the respective reactants is not critical. It is preferred to add the difunctional organosilane to the silanol-containing organosilicon material. In instances where the difunctional organosilane is used with the silanol-containing organosilicon material in an amount insufficient to provide for at least one Y radical, per silanol radical, there generally remains unreacted silanol-containing organosilicon material after intercondensation has been completed. An excess of difunctional organosilane beyond the quantity required to effect intercondensation with silanol-containing organosilicon material such as an amount sufficient to provide from 1 to 5 Y radicals per silanol radical, can provide for effective results.

Experience has shown that once the difunctional organosilane and silanol-containing organosilicon material have been thoroughly mixed, intercondensation can proceed without further agitation. Additional agitation has been found to accelerate intercondensation. Reaction times of several minutes or less, to as long as several days are not unusual depending upon the temperature utilized, degree of agitation, nature of reactants, etc.

It is preferred to practice the method of the invention under substantially anhydrous conditions to preclude any undue hydrolysis of hydrolyzable radicals of the difunctional organosilane before intercondensation is achieved with silanol-containing organosilicon material. In instances where substantially anhydrous conditions are employed, rapid addition of excess difunctional organosilane can preclude further intercondensation. Hydrolysis of terminal Y radicals, which can result in further intercondensation can be achieved by exposing the mixture to moisture.

Reactions are generally most conveniently performed at atmospheric conditions. However, pressures of below atmospheric can be utilized. Recovery of intercondensation product can readily be achieved by allowing the mixture to achieve a maximum viscosity and then removing any unreacted material or by-products under reduced pressure.

In order that those skilled in the art will be better able to practice the invention, the following examples are given by way of illustration and not by way of limitation. All parts are by weight.

EXAMPLE 1

There was added 0.25 part of methyldiacetoxysilane to 10 parts of a silanol-terminated polydimethylsiloxane having a viscosity of 3500 centipoises at 25° C. The mixture was exposed to the atmosphere for 2 days until no odor of acetic acid was detected. A gum was obtained having a viscosity of about 120 million centipoises at 25° C. Based on method of preparation, the gum was a silanol-terminated block copolymer composed of chemically combined blocks of polydimethylsiloxane joined by one or more chemically combined methylsiloxy units.

EXAMPLE 2

A mixture of 20 parts of the silanol-terminated polydimethylsiloxane of Example 1, and 0.25 part of methyldiacetoxysilane was stirred and heated at a temperature of 60° C. The methyl hydrogen diacetoxysilane was added dropwise under a stream of nitrogen to the silanol-terminated polydimethylsiloxane over a period of about an hour. Stirring at 60° C. was continued for 2 additional hours. A gum was obtained having a viscosity of 300 million centipoises at 25° C.

EXAMPLE 3

There was added 0.25 part of bis-(isopropylamino)-methylsilane to 20 parts of a silanol-terminated copolymer composed of chemically combined dimethylsiloxy units and diphenylsiloxy having a viscosity of 5,000 centipoises at 25° C. The addition was performed at a temperature of 60° C. while the mixture was stirred. After 5 hours a gum was obtained having a viscosity of 4.3 million centipoises at 25° C. Based on method or preparation, the gum was composed of segments of chemically combined dimethylsiloxy units and diphenylsiloxy units joined by one or more chemically combined methylsiloxy units.

EXAMPLE 4

A mixture of 40 parts of a silanol-terminated polydimethylsiloxane having a viscosity of 700 centipoises at 25° C., and 0.3 part of dimethylaminotrimethylsilane was heated for 2 hours at 60° C. under nitrogen atmosphere. There was added to the resulting mixture, 0.6 part of bis-isopropylaminomethylsilane; the mixture was heated for 6 additional hours. A gum was obtained having a viscosity of 8.8 million centipoises at 25° C. Based on method of preparation the gum was a trimethylsiloxy-terminated polydimethylsiloxane containing chemically combined methylsiloxy units.

A sample of the above was milled with fumed silica in a proportion of 40 parts of filler, per 100 parts of gum. In addition, there was also milled into the gum 0.15% by weight of gum of 1,3-divinyltetramethyldisiloxane. There also was milled into the mixture 0.001 part of platinum in the form of a solution of platinic chloride. A slab of the resulting composition was press-cured at 300° F. for 15 minutes. The cured product showed an average tensile (p.s.i.) of 915 and 200% elongation at break.

EXAMPLE 5

There is added 0.6 part of bis-(isopropylamino)-methylsilane to 40 parts of a silanol-terminated polydimethylsiloxane having a viscosity of 700 centipoises at 25° C. The mixture is stirred for about 6 hours at a temperature of about 60° C. A gum is obtained having terminal silanol radicals composed of blocks of polydimethylsiloxane joined with one or more chemically combined methylsiloxy units.

There are added 6 parts of alpha-methylstyrene to a mixture of 100 parts of the above gum and 300 parts of toluene. There is also added 0.001 part of platinum catalyst utilized in Example 4. The resulting mixture is allowed to stir for 4 hours at 100° C. The mixture is then stripped to give a polymer having valuable insulating and elastomeric properties. Its infrared spectrum shows that the polymer is free of silicon hydride. Based on method of preparation this polymer contains chemically combined methylstrylsiloxy units.

EXAMPLE 7

A mixture of 10 parts of a silanol-terminated polydimethylsiloxane having a viscosity of 3500 centipoises at 25° C. and 0.16 part of methyldichlorosilane was exposed to air for 18 hours under atmospheric conditions. A gum was obtained having an intrinsic viscosity in toluene of 2.4 dl./g. Based on its method of preparation, it was a silanol-terminated polydimethylsiloxane composed of blocks of dimethylsiloxane chemically combined with one or more chemically combined methylsiloxy units.

EXAMPLE 8

A mixture of equal parts of methyldichlorosilane and diphenylmethylsilanol was allowed to react at room temperature for three days. The resulting mixture was dissolved in toluene. A vapor phase chromatograph showed the presence of 1,3,5-trimethyl,1,1,5,5-tetraphenyltrisiloxane.

EXAMPLE 9

Equal parts of diphenylsilanediol and methyldiacetoxysilane were mixed under atmospheric conditions. The mixture was allowed to stand for 24 hours until no further odor of acetic acid was detected. A viscous fluid product was obtained; an infrared analysis of the product showed no silanol absorption.

EXAMPLE 10

Equal parts of 1,3-dihydroxytetraphenyldisiloxane and methyldichlorosilane were mixed under atmospheric conditions. After 24 hours no odor of hydrogen chloride was detected. The product was a highly viscous oil. Infrared indicated that the product was a linear copolymer composed of chemically combined methylsiloxy units, diphenylsiloxy units and terminal silanol radicals.

EXAMPLE 11

Equal parts of bis-(dimethylhydroxylsilyl)phenylene and methyldiacetoxysilane were mixed together. The resulting mixture was allowed to stand for 96 hours under atmospheric conditions. A slightly cross-linked gum was obtained. The gum was extracted with toluene. The infrared spectrum of the extracted portion showed that the product was composed of chemically combined methylsiloxy units and silphenylene siloxy units.

Based upon the above results, those skilled in the art know that the present invention provides a unique and advantageous method for making a variety of organosilicon block copolymers composed of blocks of organopolysiloxane, polysilarylene, polysilalkylene, polysilarylenesiloxane, etc., joined to one or more chemically combined siloxy units having hydrogen attached to silicon. The various organosilicon materials made in accordance with the invention can have terminal triorganosiloxy units, or silanol radicals. The organosilicon materials of the present invention having chemically combined siloxy units with hydrogen attached to silicon can be made with viscosities at 25° C. in the range of up to one billion centipoises at 25° C. These materials can be advantageously cured by a platinum catalyzed addition reaction with materials shown by Formula 10. In addition, these materials can be modified further with olefinically unsaturated materials by platinum catalyzed addition reaction to siloxy units with hydrogen attached to silicon.

While the foregoing examples have of necessity been limited to only a few of the very many variables within the scope of the present invention, it should be understood that the present invention covers a much broader class of organosilicon materials composed of organosiloxane, silarylene, etc., chemically combined with organosiloxy units having hydrogen attached to silicon. All of these materials are prepared by methods specifically illustrated in the examples above, and described further in the foregoing description of the present invention.

What I claim as new and desire to secure by Letters Patent of the United States is:

1. A method which comprises effecting reaction under substantially anhydrous conditions and in the substantial absence of an inert organic solvent between (A) a difunctional organosilane of the formula,

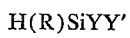

and (B) a silanol-containing organosilicon material selected from the class consisting of, (a) a silanol having the formula,

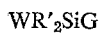

(b) a silanol containing organopolysiloxane consisting essentially of chemically combined units of the formula,

and (c) a polysilhydrocarbon consisting essentially of chemically combined units of the formula,

where R is a member selected from the class consisting of monovalent hydrocarbon radicals and halogenated monovalent hydrocarbon radicals, Y is a hydrolyzable radical, Y' is a member selected from the class consisting of Y and $(OSiR')_nY$, R' is a member selected from the class consisting of R radicals and cyanoalkyl radicals, W is a member selected from the class consisting of hydroxy, and R', G is a member selected from the class consisting of hydroxy and $R''SiR'_2OH$, R'' is a divalent hydrocarbon radical, and $n$ is an integer equal to 1 to 1,500 inclusive.

2. A method in accordance with claim 1, where said silanol-containing organosilicon material has the formula,

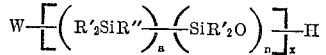

where R' is a member selected from the class consisting of monovalent hydrocarbon radicals, halogenated monovalent hydrocarbon radicals and cyanoalkyl radicals, W is a member selected from the class consisting of hydroxy and R', $a$ is a whole number equal to 0 to 100, inclusive, $n$ is an integer equal to 1 to 1,500, inclusive, and $x$ is equal to 1, and when $n$ and $a$ are equal to 1, $x$ can be equal to 1 to 100, inclusive.

3. A method in accordance with claim 1 in which the silanol-containing organosilicon material consists essentially of chemically combined units of the formula,

where R' is a member selected from the class consisting of monovalent hydrocarbon radicals, halogenated monovalent hydrocarbon radicals and cyanoalkyl radicals.

4. A method in accordance with claim 1, in which said difunctional organosilane is a bis-(amino)-silane of the formula, H(R)SiQQ' where R is a member selected from the class consisting of monovalent hydrocarbon radicals and halogenated monovalent hydrocarbon radicals, R' is a member selected from the class consisting of R radicals and cyanoalkyl radicals, Q is a monovalent amine radical selected from —NR'''V and a heterocyclic amine joined to silicon by a silicon-nitrogen linkage, R''' is selected from alkyl and cycloalkyl radicals, V is a member selected from hydrogen and R''' radicals, Q' is a member selected from Q and (OSiR'$_2$)$_n$SiR(H)Q, and $n$ is an integer equal to 1 to 1,500, inclusive.

5. A method in accordance with claim 1 in which said difunctional organosilane is a diacyloxyorganosilane of the formula, H(R)Si(OCOR''')(Z)

where R is a member selected from the class consisting of monovalent hydrocarbon radicals and halogenated monovalent hydrocarbon radicals, R''' is selected from the class consisting of alkyl and cycloalkyl radicals, Z is selected from the class consisting of OCOR''' and (OSiR'$_2$)$_n$SiR(H)OCOR'''

R' is a member selected from the class consisting of monovalent hydrocarbon radicals, halogenated monovalent hydrocarbon radicals and cyanoalkyl radicals, and $n$ is an integer equal to 1 to 1,500, inclusive.

6. A method in accordance with claim 1 in which said difunctional organosilane is a dihalogenoorganosilane of the formula, H(R)SiXX' where R is a member selected from the class consisting of monovalent hydrocarbon radicals and halogenated monovalent hydrocarbon radicals, X is a halogen radical and X' is selected from the class consisting of X and (OSiR'$_2$)$_n$SiR(H)Y, where R' is a member selected from the class consisting of monovalent hydrocarbon radicals, halogenated monovalent hydrocarbon radicals and cyanoalkyl radicals, and $n$ is an integer equal to 1 to 1,500, inclusive.

7. A method which comprises effecting reaction under substantially anhydrous conditions and in the substantial absence of an inert organic solvent between bis-(dimethylamino) methylsilane and a silanol-terminated polydimethylsiloxane.

8. A method which comprises effecting reaction under substantially anhydrous conditions and in the substantial absence of an inert organic solvent between diacetoxymethylsilane and a silanol-terminated polydimethylsiloxane.

9. A method which comprises effecting reaction under substantially anhydrous conditions and in the substantial absence of an inert organic solvent between methyldichlorosilane and a silanol-terminated polydimethylsiloxane.

10. Block copolymers composed of blocks selected from a member of the class consisting of polydiorganosiloxane consisting essentially of from 5 to 1,000 chemically combined units of the formula, R'$_2$SiO polysilhydrocarbon consisting essentially of from 5 to 1,000 chemically combined units of the formula, R'$_2$SiR'' and an organo silicon polymer consisting essentially of from 5 to 1,000 chemically combined R$_2$SiO units and R'$_2$SiR'' units, where said blocks are joined to each other by one or more chemically combined HR'SiO units, where R' is a member selected from the class consisting of monovalent hydrocarbon radicals, halogenated monovalent hydrocarbon radicals, and cyanoalkyl radicals and R'' is a divalent hydrocarbon radical.

11. A block copolymer composed of chemically combined blocks of polydimethylsiloxane consisting essentially of from 5 to 1,000 chemically combined dimethylsiloxy units where said blocks are joined by one or more chemically combined methylsiloxy units.

12. A block copolymer in accordance with claim 11, having a viscosity of at least 500,000 centipoises at 25° C.

13. A composition comprising (A) 100 parts of a block copolymer having a viscosity of at least 500,000 centipoises at 25° C. having blocks consisting essentially of from 5 to 1,000 chemically combined units of the formula, R'$_2$SiO joined by one or more chemically combined units of the formula, HR'SiO and ($b$) 10 to 300 parts of a filler.

References Cited

UNITED STATES PATENTS

| | | | |
|---|---|---|---|
| 2,483,158 | 9/1949 | Sprung | 260—46.5 |
| 3,109,013 | 10/1963 | Haluska | 260—448.2 |
| 3,280,072 | 10/1966 | Frankland | 260—448.2 |
| 3,328,323 | 6/1967 | Vaughn | 260—46.5 |
| 3,328,481 | 6/1967 | Vincent | 117—124 |

FOREIGN PATENTS 708,223   4/1965   Canada.

MORRIS LIEBMAN, Primary Examiner

L. T. JACOBS, Assistant Examiner

U.S. Cl. X.R.

260—46.5, 825